United States Patent [19]
Anderson

[11] 3,741,389
[45] June 26, 1973

[54] FILTERING APPARATUS

[75] Inventor: Herbert S. Anderson, Briarcliff Manor, N.Y.

[73] Assignee: Anaconda Wire and Cable Company, New York, N.Y.

[22] Filed: Nov. 24, 1971

[21] Appl. No.: 201,920

[52] U.S. Cl. .............. 210/77, 210/79, 210/387, 210/391, 210/401
[51] Int. Cl. .............................. B01d 33/14
[58] Field of Search ............... 210/67, 107, 387, 210/391, 400, 401

[56] References Cited
UNITED STATES PATENTS

| | | |
|---|---|---|
| 2,043,181 | 6/1936 | Lamort .......................... 210/401 |
| 2,097,529 | 11/1937 | Nordell .......................... 210/396 |
| 2,793,756 | 5/1957 | Haltmeir ........................ 210/400 |
| 3,690,466 | 9/1972 | Lee et al. ...................... 210/387 |

Primary Examiner—Samih N. Zaharna
Assistant Examiner—I. Cintins
Attorney—Victor F. Volk

[57] ABSTRACT

An adherent filter cake is removed from areas of a filter cloth by progressively suspending the cloth and beating the reverse side. The beater bars are shaped in undulations so that different bars strike different points across the width of the cloth.

5 Claims, 3 Drawing Figures

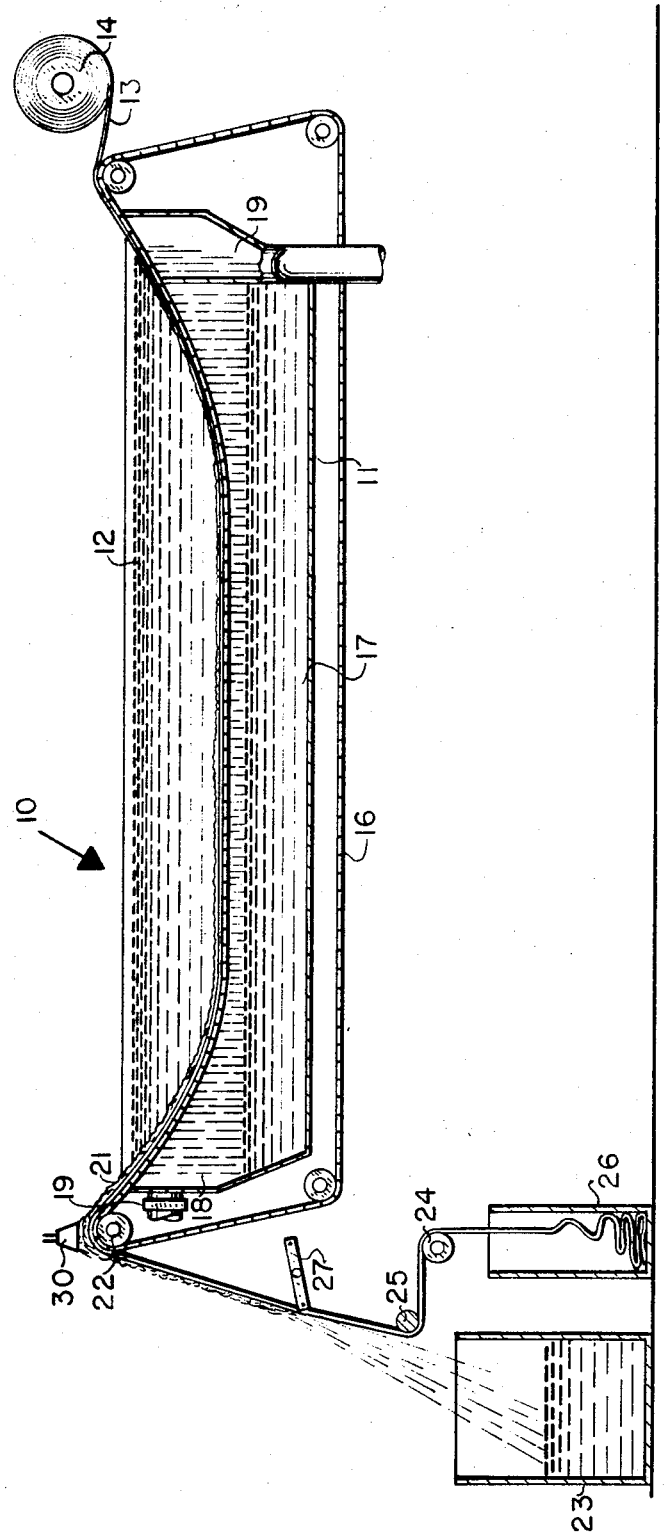
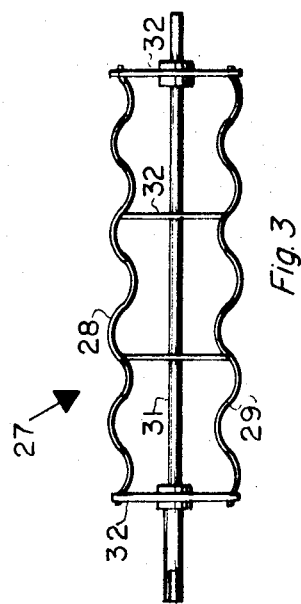
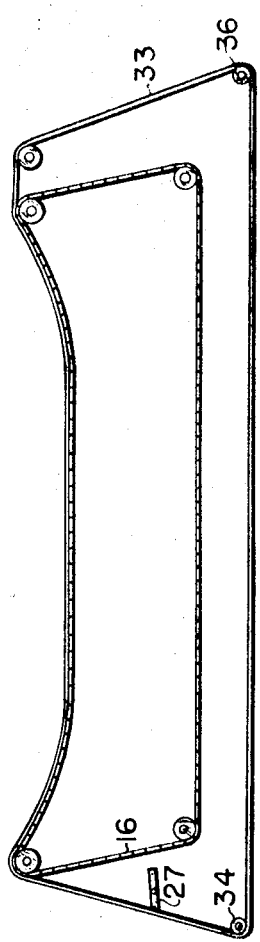

FILTERING APPARATUS

BACKGROUND OF THE INVENTION

In industrial filtration of various types of slurry it has been known to facilitate the removal of filter cake by scraping and/or brushing the cake from the filter cloth and by momentarily reversing the flow of filtrate. In a copper mill, however, a particularly adherent and unmanageable filter cake is formed that is not satisfactorily removed by known methods. The slurry from which this troublesome cake is precipitated, comprises the cooling water that is applied to the mill rolls, oil washed from the rolls, suspended particles of copper oxide and some suspended copper. To avoid copper contamination of the water source and to permit repeated reuse of the cooling water the metal, oxide and any other solids are filtered from the slurry.

SUMMARY

I have invented a filtration apparatus that comprises means for confining a volume of slurry, an elongated filter cloth that may take the form of an endless band, and means for advancing the filter cloth in contact with the slurry so as to pass filtrate through the cloth and deposit a filter cake on the cloth. My apparatus also comprises means for progressively advancing areas of the cloth, bearing the filter cake, to a station removed from said slurry, depository means for the cake, below the station, means for progressively suspending the advancing areas of the cloth above the depository means, and beater means on the side of the cloth opposite to the cake for striking the areas of cloth to loosen the cake and cause it to fall into the depository means. Advantageously, my beater means comprises a plurality of undulatory rods mounted on a rotating frame, with the undulations of at least one of the rods being out of phase with another of the rods.

I have invented a method of filtering an aqueous slurry that comprises particles tending to adhere to filter cloth such as a slurry comprising an oil emulsion and particles of copper oxide, comprising the steps of advancing an elongated filter cloth through a filtration zone and therein precipitating an adherent filter cake, comprising the particles, upon the cloth, progressively suspending areas of the cloth above a deposition zone for the cake, and progressively mechanically beating the areas on the side of the cloth opposite to the cake, thereby loosening the cake from the cloth within the deposition zone. Advantageously, the beating step applies impacts to separate points across the width of the cloth and succeeding impacts are applied to laterally different points.

BRIEF DESCRIPTION OF THE DRAWING

FIG. 1 shows a side view of the apparatus of my invention.

FIG. 2 shows a side view of another embodiment of the apparatus of my invention.

FIG. 3 shows a side view of the beater of my apparatus.

DETAILED DESCRIPTION OF PREFERRED EMBODIMENT

In my apparatus, indicated generally by the numeral 10 a tank 11 contains a volume of slurry 12 of the cooling water from a wire mill. An elongated filter cloth 13 is paid from a cloth roll 14 onto an endless supporting screen 16 below the slurry 12. A filtrate 17 filters through the cloth 13 under the influence of suction created in a chamber 18 by suction pump 19. A filter cake 21 builds up on the filter cloth and is carried out of the slurry by the cloth which advances over a roll 22 mounted above a deposition bin 23. The cloth 13 is advanced by the movement of the screen 16 up to the roll 22 whence it drops to a fixed bar 25 and a driven roll 24 and is finally discarded into a receptacle 26. The forward motion of the cloth 13 may be continuous but it has been customary to have the cloth advance intermittently by driving the screen under the control of the suction head within the chamber 18. Heat lamps 30 above the roll 22 dry the cake 21 but the cake still would adhere to the cloth 12 except for a novel feature of my invention, a beater 27 comprising two undulatory or wavy rods 28, 29 in a frame formed of a shaft 31 and four cross bars 32. The beater 27 is rotated at a speed of 60–80 rpm so as to strike an area of the cloth 13 that is suspended from the roll 22, dislodging the cake 21 and causing it to fall into the bin 23.

As shown in FIG. 3 the undulations of the rod 28 are out of phase with the undulations of the rod 29 in that, where a section of the rod 28 is bent toward the shaft 31, the corresponding section of the rod 29 is bent away from the shaft. As a consequence the two rods do not strike the cloth at the same points across its width. This alternation of blows from the beater at different points of the cloth creates a lateral stretching which I have found to add significantly to the effectiveness of the beater in dislodging filter cake from the cloth. For the type of described operation where the cloth advances intermittently the beater 27 does not turn during the periods when the cloth is stationary but is driven, along with the roll 24, to turn whenever the screen 16 is advanced.

In FIG. 2 I have shown an embodiment of my apparatus wherein a filter cloth 33 is endless, and instead of being discarded after use, is returned around rolls 34, 36 into the slurry 12 for reuse.

In the method of my invention the slurry 12 containing water, copper oxide, copper particles and an oily emulsion from the rolling mill is pumped into the tank 11 over the cloth 13 supported on the screen 16. Water from the slurry 12 filters through the cloth 13, and when a sufficient thickness of filter cake has built up on the filter cloth to allow a preselected partial vacuum to exist in the chamber 18 the rolls 22 and 24 automatically turn to advance the filter cake under the dryer 30 into a vertical suspended position over the depository receptacle 23. The beater 27 is also automatically turned to strike the cloth on the side opposite to the filter cake precipitate and dislodge the cake into the receptacle 23.

The foregoing description of my novel apparatus and method has been exemplary rather than definitive of my invention for which I desire an award of Letters Patent as defined in the appended claims.

I claim:

1. Filtration apparatus comprising:
    A. means for confining a volume of slurry,
    B. an elongated filter cloth,
    C. means for advancing said cloth in contact with said slurry, thereby passing filtrate from said slurry through said cloth and precipitating a filter cake upon said cloth, D. means for progressively advancing areas of said cloth, bearing said cake, to a station removed from said slurry,
E. depository means for said cake, below said station,
F. means for progressively suspending said areas above said depository means,
G. beater means on the side of said cloth opposite to said cake for striking said areas of cloth thereby loosening said cake from said cloth, said cake falling into said depository means, said beater means comprising a plurality of undulatory rods mounted on a rotating frame, the undulations of at least one of said rods being out of phase with the undulations of at least one other of said rods thereby applying beating impacts to separated points across the width of said cloth and succeeding impacts of said beating being applied to laterally different of said points.

2. The apparatus of claim 1 wherein said cloth forms an endless band.

3. The method of filtering an aqueous slurry comprising particles tending to adhere to filter cloth comprising the steps of:

A. advancing an elongated filter cloth through a filtration zone and therein precipitating an adherent filter cake comprising said particles upon said cloth,
B. progressively suspending areas of said cloth above a deposition zone for said cake, and
C. progressively mechanically beating said areas on the side of said cloth opposite said cake with a beater means comprising a plurality of undulatory means mounted on a rotating frame, the undulations of at least one of said undulatory means being out of phase with the undulations of at least one other of said undulatory means, said beating applying impacts to separated points across the width of said cloth and succeeding impacts of said beating being applied to laterally different of said points, thereby loosening said cake from said cloth within said deposition zone.

4. The method of claim 3 wherein said particles comprise copper oxides.

5. The method of claim 3 wherein said slurry comprises an oil emulsion and particles of copper oxide.

* * * * *